(12) United States Patent
Boorer

(10) Patent No.: US 7,341,407 B2
(45) Date of Patent: Mar. 11, 2008

(54) RASP BLADE WITH CUTTING TEETH LATERALLY DISPLACED FROM A PLANAR BODY

(75) Inventor: Noel Harold Boorer, Auburn (AU)

(73) Assignee: Pincott International Pty. Ltd., Rouse Hill, NSW (AU)

( * ) Notice: Subject to any disclaimer, the term of this patent is extended or adjusted under 35 U.S.C. 154(b) by 427 days.

(21) Appl. No.: 10/752,039

(22) Filed: Jan. 7, 2004

(65) Prior Publication Data
US 2005/0085154 A1  Apr. 21, 2005

(30) Foreign Application Priority Data
Oct. 21, 2003  (AU) .............................. 2003255189

(51) Int. Cl.
  B23D 71/00  (2006.01)
  B26D 1/12  (2006.01)
(52) U.S. Cl. ................ 407/29.1; 407/29.13; 407/29.14
(58) Field of Classification Search ............... 407/29.1, 407/29.13, 29.14
See application file for complete search history.

(56) References Cited

U.S. PATENT DOCUMENTS

| | | | |
|---|---|---|---|
| 2,896,309 A | 7/1959 | Jensen | |
| 3,074,148 A | 1/1963 | Hemmeter | |
| 3,082,506 A | 3/1963 | Jensen | |
| 3,618,187 A | 11/1971 | Jensen | |
| 3,680,185 A | 8/1972 | Wood | |
| 3,747,177 A * | 7/1973 | Jensen | 407/29.12 |
| 3,879,825 A * | 4/1975 | Jensen et al. | 407/29.12 |
| 4,019,234 A | 4/1977 | Jensen et al. | |
| 4,021,899 A * | 5/1977 | Jensen | 407/29.12 |
| 4,059,875 A * | 11/1977 | Jensen | 407/29.12 |
| 4,091,516 A * | 5/1978 | Jensen et al. | 407/29.12 |
| 4,336,640 A | 6/1982 | Willinger | |
| 4,747,194 A * | 5/1988 | Wood et al. | 407/29.12 |
| 4,902,313 A | 2/1990 | Penter | |
| 5,033,175 A | 7/1991 | Jensen | |
| 5,054,177 A | 10/1991 | Jensen | |

(Continued)

FOREIGN PATENT DOCUMENTS

AU  199958291 B3  5/2000

OTHER PUBLICATIONS

Understanding Retreading, International Tire & Rubber Association Foundation, Inc., 2001.

*Primary Examiner*—Willmon Fridie, Jr.
(74) *Attorney, Agent, or Firm*—Bernarr R. Pravel; James W. Pravel

(57) ABSTRACT

A tire rasp blade made with an arcuate shape having a planar body with cutting teeth at the outer working edge. The cutting teeth extend laterally relative to the planar body in alternating sets of curved sections. The curved sections preferably form a sinusoidal curve along the outer working edge. The tire rasp blade is made by initially forming an arcuate blade of planar material that has an outer periphery of varying radii from a center point of the arcuate blade; then cutting teeth are formed at the varying radii of the working edge of the planar material; and then an outer portion of the planar material is deformed laterally in opposite directions to form alternating, oppositely curved sections, with the cutting teeth all lying approximately at the same circumferential radius so that they all contact the tire to be buffed.

21 Claims, 6 Drawing Sheets

U.S. PATENT DOCUMENTS

| | | |
|---|---|---|
| 5,075,942 A | 12/1991 | Jensen |
| 5,283,935 A | 2/1994 | Jensen |
| 5,301,406 A | 4/1994 | Pincott |
| 5,461,762 A | 10/1995 | Jensen |
| 5,504,981 A | 4/1996 | Jensen et al. |
| 5,647,698 A | 7/1997 | Jensen |
| 6,554,547 B1 | 4/2003 | Collins |
| 2002/0164216 A1 | 11/2002 | Collins |
| 2003/0072623 A1 | 4/2003 | Stanfield |

* cited by examiner

9" Hub

| Tooth Pair | Radius (mm) |
|---|---|
| 1 | 114.2 |
| 2 | 114.5 |
| 3 | 114.8 |
| 4 | 114.5 |
| 5 | 114.2 |
| 6 | 114.2 |
| 7 | 114.5 |
| 8 | 114.8 |
| 9 | 114.5 |
| 10 | 114.2 |
| 11 | 114.2 |
| 12 | 114.5 |
| 13 | 114.8 |
| 14 | 114.5 |
| 15 | 114.2 |
| 16 | 114.2 |
| 17 | 114.5 |
| 18 | 114.8 |
| 19 | 114.5 |
| 20 | 114.2 |

10.5" Hub

| Tooth Pair | Radius (mm) | |
|---|---|---|
| | 20 Pairs | 22 Pairs |
| 1 | 133.55 | 133.55 |
| 2 | 133.85 | 133.85 |
| 3 | 134.15 | 134.15 |
| 4 | 133.85 | 133.85 |
| 5 | 133.55 | 133.55 |
| 6 | 133.55 | 133.35 |
| 7 | 133.85 | 133.55 |
| 8 | 134.15 | 133.85 |
| 9 | 133.85 | 134.15 |
| 10 | 133.55 | 133.85 |
| 11 | 133.55 | 133.55 |
| 12 | 133.85 | 133.55 |
| 13 | 134.15 | 133.85 |
| 14 | 133.85 | 134.15 |
| 15 | 133.55 | 133.85 |
| 16 | 133.55 | 133.55 |
| 17 | 133.85 | 133.35 |
| 18 | 134.15 | 133.55 |
| 19 | 133.85 | 133.85 |
| 20 | 133.55 | 134.15 |
| 21 | | 133.85 |
| 22 | | 133.55 |

11.5" Hub

| Tooth Pair | Radius (mm) | |
|---|---|---|
| | 20 Pairs | 22 Pairs |
| 1 | 146.25 | 146.25 |
| 2 | 146.55 | 146.55 |
| 3 | 146.85 | 146.85 |
| 4 | 146.55 | 146.55 |
| 5 | 146.25 | 146.25 |
| 6 | 146.25 | 146.05 |
| 7 | 146.55 | 146.25 |
| 8 | 146.85 | 146.55 |
| 9 | 146.55 | 146.85 |
| 10 | 146.25 | 146.55 |
| 11 | 146.25 | 146.25 |
| 12 | 146.55 | 146.25 |
| 13 | 146.85 | 146.55 |
| 14 | 146.55 | 146.85 |
| 15 | 146.25 | 146.55 |
| 16 | 146.25 | 146.25 |
| 17 | 146.55 | 146.05 |
| 18 | 146.85 | 146.25 |
| 19 | 146.55 | 146.55 |
| 20 | 146.25 | 146.85 |
| 21 | | 146.55 |
| 22 | | 146.25 |

RASP BLADE WITH CUTTING TEETH LATERALLY DISPLACED FROM A PLANAR BODY

BACKGROUND

37 C.F.R § 1.77(b)(5)

This invention relates to the field of rasp blades used for removing worn tread material from a tire carcass to prepare the tire carcass for retreading.

Retreading tires is a large and important industry in the United States and worldwide. A retreaded tire costs much less to use than a new tire, and it sells for less—usually between 30% to 50% of the comparable new tire price. When a tire has become worn and seems ready to be discarded, the bulk of its cost remains unrecovered. In the United States, all federal agencies are required to replace the original tires on their vehicles with retreaded tires. All commercial airlines, as well as military jet aircraft, use retreaded tires. In 2001, approximately 80% of all aircraft tires in commercial airline service in the United States were retreaded tires.

Retreading tires benefits the environment by conserving oil. The synthetic rubber components in a new passenger tire contain 7 to 8 gallons of oil. Retreading that same tire uses only 2 to 3 gallons of oil. The manufacture of a new medium truck tire requires 22 gallons of oil, but only 7 gallons to retread the existing tire carcass. Every year in North America, the use of retreaded tires saves over 400 million gallons of oil and every tire that is retreaded is one less tire that must be placed in overcrowded landfills.

In a well-known process for retreading suitable worn tires the worn tread is cut or buffed away to provide what is known as a casing. Then any damage remaining in the casing after buffing is repaired, and new tread is bonded to the casing with vulcanization. The resulting retreaded tire is then inspected to be sure that it is suitable to be used.

When a tire is prepared for retreading, it is first mounted on a buffing machine or lathe type machine and inflated. A rasp hub assembly, comprising a rasp hub having a large number of toothed rasp blades mounted on the periphery of the rasp hub, is rotated and the peripheral surface of the worn tire is moved against the periphery of the rotating rasp hub assembly to loosen, tear and grind off the excess rubber and roughen it sufficiently so that the buffed surface of the casing can bond the new rubber tread during the vulcanization process. Each tire has a predetermined crown width, profile and radius and the casing must be buffed to the appropriate size, shape and texture to receive a new tread that will provide optimal tread to road contact. The buffing of the worn tread is therefore a critical stage of the retreading process.

Rasp blades generally have a plurality of pairs of teeth, each pair of teeth having a dovetail shape, where all of the teeth provide an outer cutting edge for cutting the worn tire tread. Each pair of teeth has a notch between its two teeth formed by cutting out a portion of the blade therebetween, thereby forming a substantially "Y" shaped pair of teeth, each such pair of teeth separated by recesses of partly incomplete circular shape. The notch formed between each tooth in a pair divides the pair into offset halves, each half defining a tooth having a respective peripheral cutting edge and being located on opposite sides of the general plane in which the body of the blade lies, so that one cutting edge may assume a position as a leading cutting edge when an assembly of such blades on a tire rasp hub is rotated in either direction. As the rasp hub assembly is rotated, the leading cutting edge buffs or cuts away the peripheral surface of the worn tire to a texture, which markedly improves the bonding of the new tread thereto.

A typical rasp hub assembly that includes rasp blades as just described has the form of a hub defined by interconnected front and back circular end plates having arcuate or quadrant shaped rasp blades arranged between the end plates in four or more separate parallel stacks located around the circumferential perimeter of the hub. Each rasp blade of any one stack is separated from its adjacent other blade of the stack by a spacer, the stack being secured in position between the end plates by support pins. Removable fasteners hold the end plates together, sandwiching the rasp blades, thus allowing for dismantling of the rasp hub assembly for purposes of service and repair, such as when the rasp blade teeth become worn or the blades are broken.

Many conventional rasp blades have teeth that are formed on the same plane of the rasp blade body. For example, see U.S. Pat. No. 5,075,942. Such conventional tire rasp blades may be mounted at an angle relative to the direction of rotation on a tire buffing machine to increase the width of the cut on the tire being buffed. The angle is achieved by using wedge shaped spacers between the rasp blades that are positioned next to the end plates on the rasp hub. Parallel spacers between intermediate rasp blades allow all blades to be parallel to each other, but at an angle relative to the direction of rotation of the rasp hub. It is desirable to increase the width of the cut to reduce or eliminate the amount of required sideways movement between the worn tire and the hub assembly. Such sideways movement extends the time required to buff away the necessary amount of tread from the worn tire, thereby generating unwanted heat buildup. The heat buildup can adversely affect the texture of the buffed surface. The heat buildup can also weaken the rasp blade and cause the blades to break when exposed to the lateral forces on the blades during the sideways movement.

Another technique for increasing the width of the cut is to bend the body of the blade to form a V-shape at its vertex, as in U.S. Pat. No. 5,504,981, which shows the body of a blade bent at its mid-point to form two, linearly inclined, axially facing flat wings. Such an approach is also seen in U.S. Pat. No. 5,461,762. However, by bending the blade body at the vertex, the lateral strength of the blade may be reduced. Reduction in lateral strength can cause undesirable lateral deformation and can result in broken blades and reduced blade life. Furthermore, when the body of a rasp blade is bent in the mid-point, the use of non-standard similarly bent spacers are required, and a non-standard rasp blade hub that conforms to the bent shape of the blade body may be required.

An alternative technique available to increase the cutting width without reducing the lateral strength of the blade body is to form the outer cutting teeth region of the blade without bending the planar portion of the blade body. For example, U.S. Pat. No. 4,336,640 shows alternating sections of the outer peripheral tooth region being bent laterally relative to the plane of the blade body. Such an alternating bent configuration however, has a discontinuity between the alternating sections. The discontinuity can reduce the lateral strength of the blade's cutting edge and can result in a non-uniform buffed surface of the tire being cut. The discontinuity between the laterally bent sections can also cause unbuffed ridges at the point on the tire that is not being contacted by cutting teeth. The resulting ridges would then need to be buffed and such a follow-up procedure is inconvenient, time consuming and expensive.

In view of the foregoing problems, this invention provides a tire rasp blade that has a planar body and a cutting tooth portion to provide maximum lateral strength, in which alternating, laterally displaced rows of teeth have a substantially continuous transition of the teeth at the working edge.

SUMMARY

37 C.F.R § 1.77(b)(6)

The present invention is directed to an improved tire rasp blade, which is used for forming a substantially uniform surface on a tire carcass, and for the purpose of preparing that surface for receiving retread material, which is bonded by vulcanizing or is otherwise attached to the tire carcass. A preferred embodiment of the present invention includes a planar body and a separate portion of laterally displaced cutting teeth at its outer working edge. Each of the cutting teeth extend laterally relative to the planar body and are formed in substantially continuously alternating lateral sets of oppositely curved sections. In the preferred embodiment, the alternating sets of curved sections form a generally sinusoidal curve along the outer periphery. There may be varying numbers of curves, such as 3 or 4 or 5 or more.

A method of manufacturing a preferred embodiment of the present invention includes the steps of initially forming an arcuate blade of planar material that has an outer periphery having varying radii from a center point of the arcuate blade. Then cutting teeth are formed at the outer periphery separately from the planar material. The outer portion adjacent to the planar material is then bent in opposite directions to form alternating, oppositely curved cutting teeth sections laterally displaced from a plane perpendicular to the axis of rotation of the blade and extending angularly from the perpendicular plane of the blade. After bending, the radii of the cutting teeth on the curved sections preferably all lie on substantially the same circumferential radius. The substantially uniform radius allows all cutting teeth to engage the surface of the worn tire when cutting and buffing the tire surface.

The preferred embodiment of the inventive rasp blade provides a substantially continuous transition between the alternating, laterally bent curved tooth sections. The substantially continuous transition has been found by the inventor to contribute to several significant advantages, including but not limited to the following:

First, all teeth on the cutting edge of the rasp blade perform cutting and buffing work on the tire to be cut because there is a continuous transition between laterally bent alternating sections. In addition, the uniform radius to the cutting teeth causes all of the teeth to contact the surface of the tire during the cutting and buffing procedure.

Second, the continuous transition between the laterally bent alternating sections is believed to contribute to added blade strength that resists lateral forces and lateral deformation. The resistance to lateral forces is also believed to result in less blade breakage and an increased life of the blade. The extended blade life reduces the operating costs to the company, which is performing the tire buffing operation.

Third, the continuous transition cuts the tire surface consistently to create a substantially uniform buffed texture that is desirable for the application and bonding of the new tire tread. The continuous transition between alternating curved sections also results in an improved texture of the buffed surface.

Fourth, the continuous transition avoids the production of thin strips of rubber from the tire shoulder or from between the alternating bent sections. The thin strips that would otherwise be created, feed into and foul the exhaust system used in the buffing process, and can create ridges on the tire that would then need to be rebuffed.

When using a tire rasp hub assembly, it is typical to move the rasp blades sideways relative to the tire being buffed. Because the preferred embodiment of the present invention increases the cutting width with its curved, oppositely laterally bent alternating sections, the amount of sideways movement of the rasp blades is eliminated or can be reduced. Excessive side movement builds up heat, takes additional time to buff the tire, and causes the blades to heat up. The heat build-up reduces the life expectancy of the blades. The reduction of necessary sideways movement of the preferred embodiment of the present invention reduces the heat buildup and therefore increases the life of the blade. The increased life of the blade reduces costs to the operator.

Conventional rasp blade hubs use spacers between blades. The spacers are generally designed for use with rasp blades having planar bodies. Because the body of the blade in the preferred embodiment is planar, it can be used with conventional spacers on existing rasp blade hubs. This can save the operator tooling costs because the inventive rasp blade can be used on existing rasp hub equipment.

BRIEF DESCRIPTION OF THE DRAWINGS

37 C.F.R § 1.77(b)(7)

Figure 1:
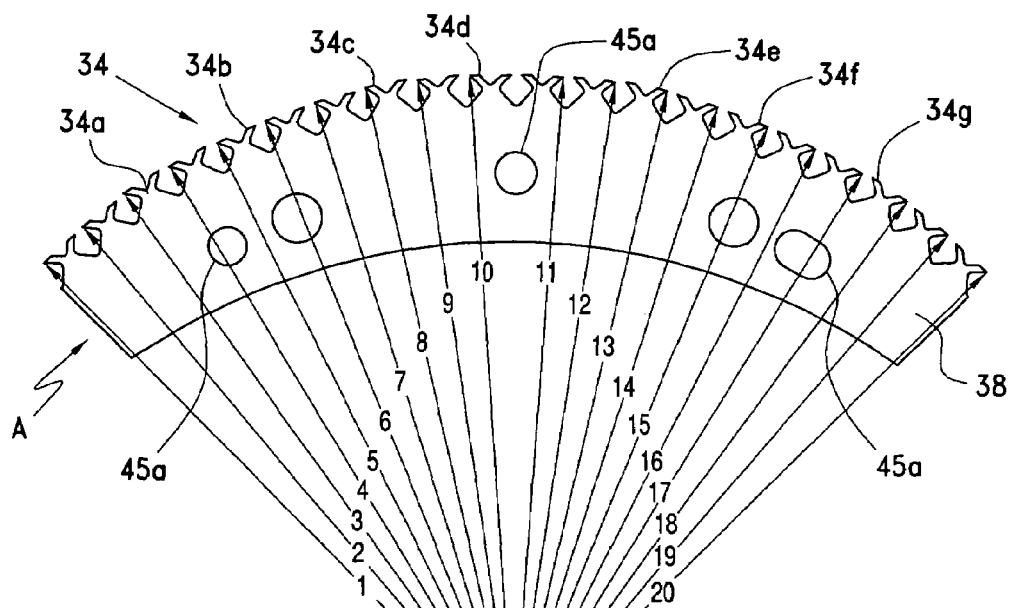

There are six (6) sheets of drawing attached.

The above and other embodiments of the present invention may be more fully understood from the following detailed description of an illustrative embodiment when taken together with an accompanying drawing wherein similar reference characters refer to similar elements throughout and in which:

FIG. 1 is a side view of a tire rasp blade in the preferred form of the present invention, showing the varying radii of the blade before the outer periphery is bent.

Figure 1A:
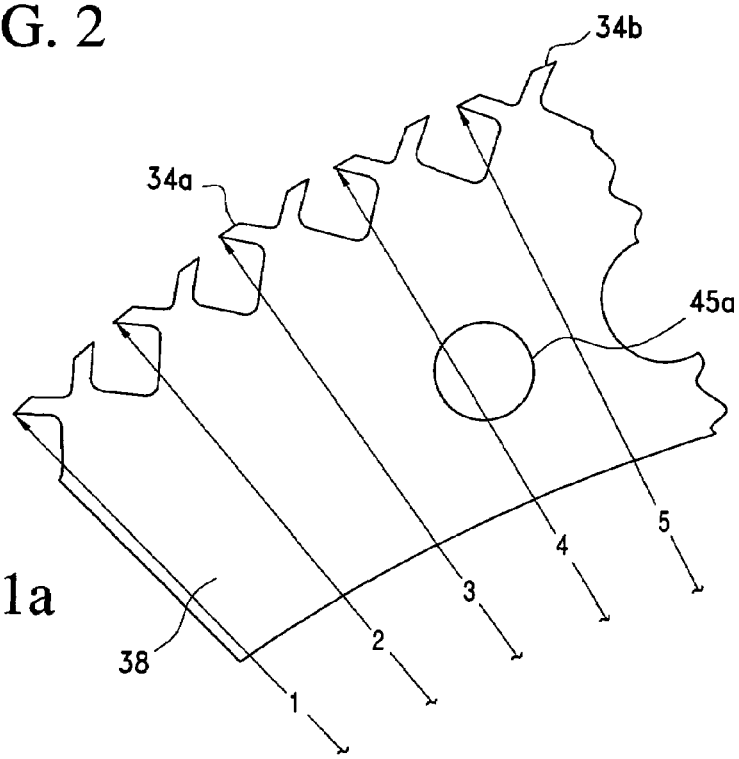

FIG. 1*a* is an enlarged sectional side view of the blade of FIG. 1.

Figure 2:
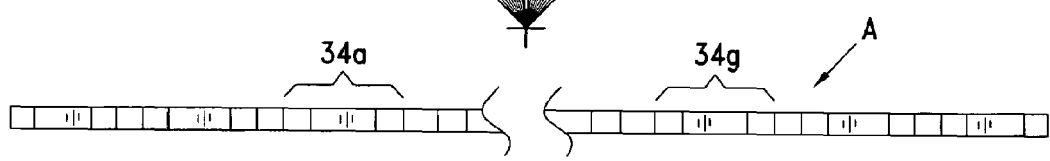

FIG. 2 is a top view, showing a portion of the edge of the rasp blade shown in FIG. 1.

Figures 3, 3A, 3B, 4:
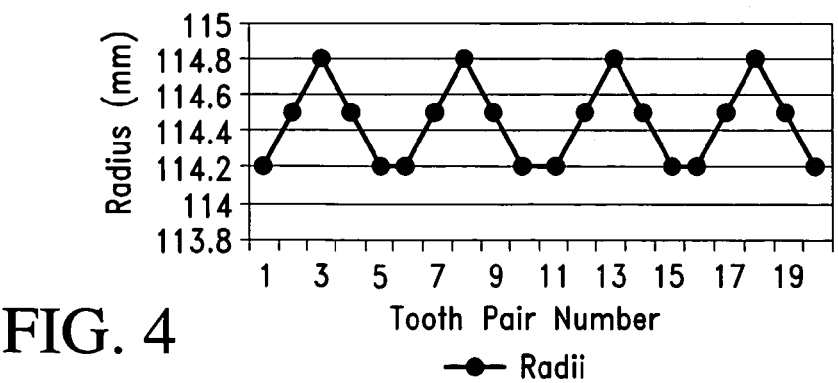

FIG. 3 is a table that includes the dimensions of the radii of the tooth pairs identified on the rasp blade shown in FIG. 1.

FIG. 3*a* is a graph of the radii dimensions for a first alternative preferred embodiment of the invention.

FIG. 3*b* is a graph of the radii dimensions for a second alternative preferred embodiment of the invention.

FIG. 4 is a graph of the radii dimensions from the table shown in FIG. 3.

Figure 5:
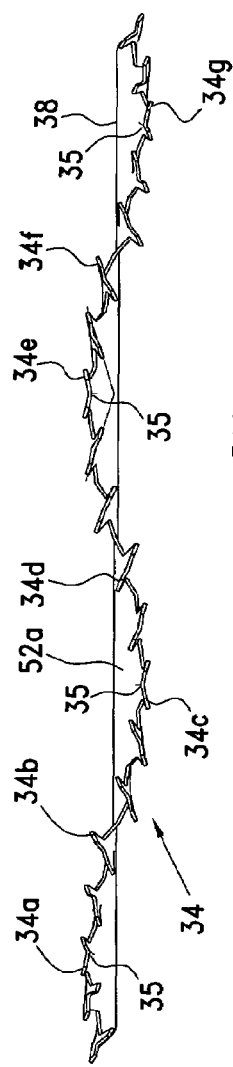

FIG. 5 is a top or plan view of a tire rasp blade in the preferred form of the present invention, showing the blade after the outer periphery has been bent.

Figure 5A:
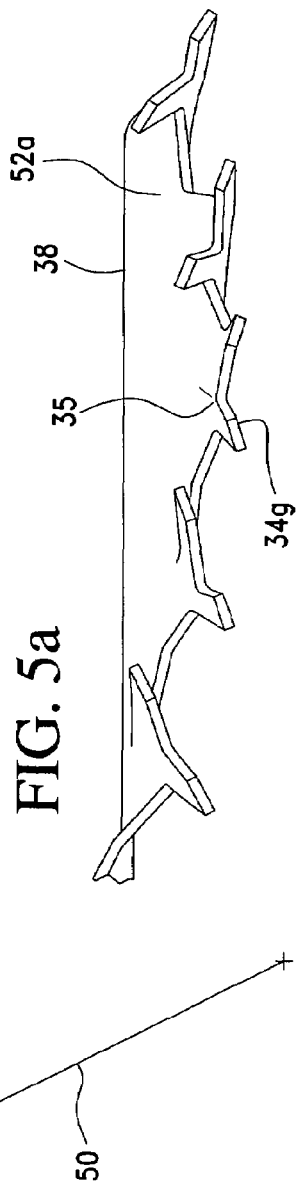

FIG. 5*a* shows a top view of enlarged details of a curved section of the rasp blade of FIG. 5.

Figure 6:
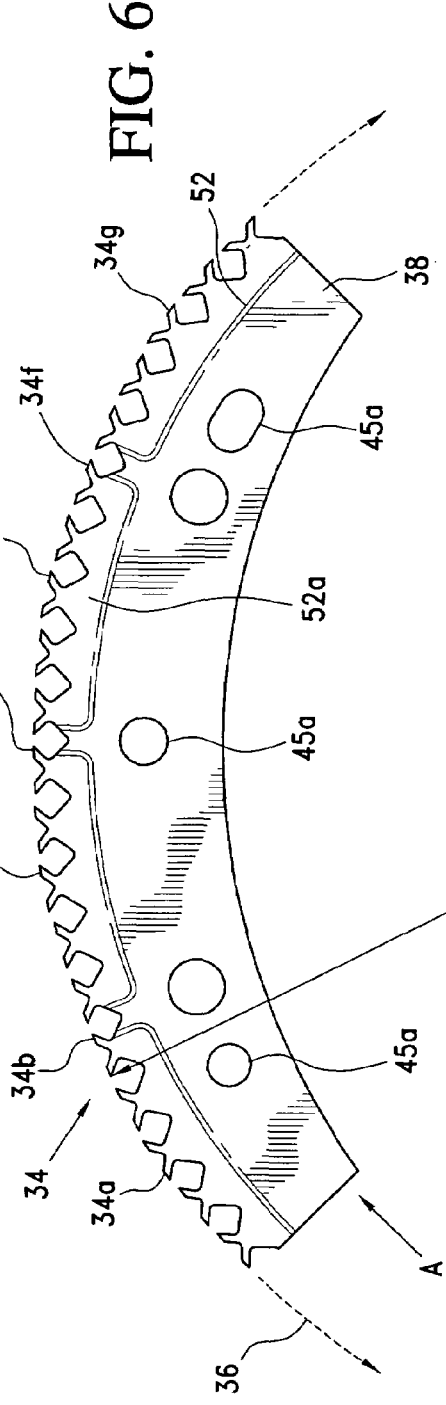

FIG. 6 is a side view of the rasp blade of FIG. 5, showing the final substantially uniform radius of the tooth pairs after the outer periphery of the blade has been bent.

Figure 7:
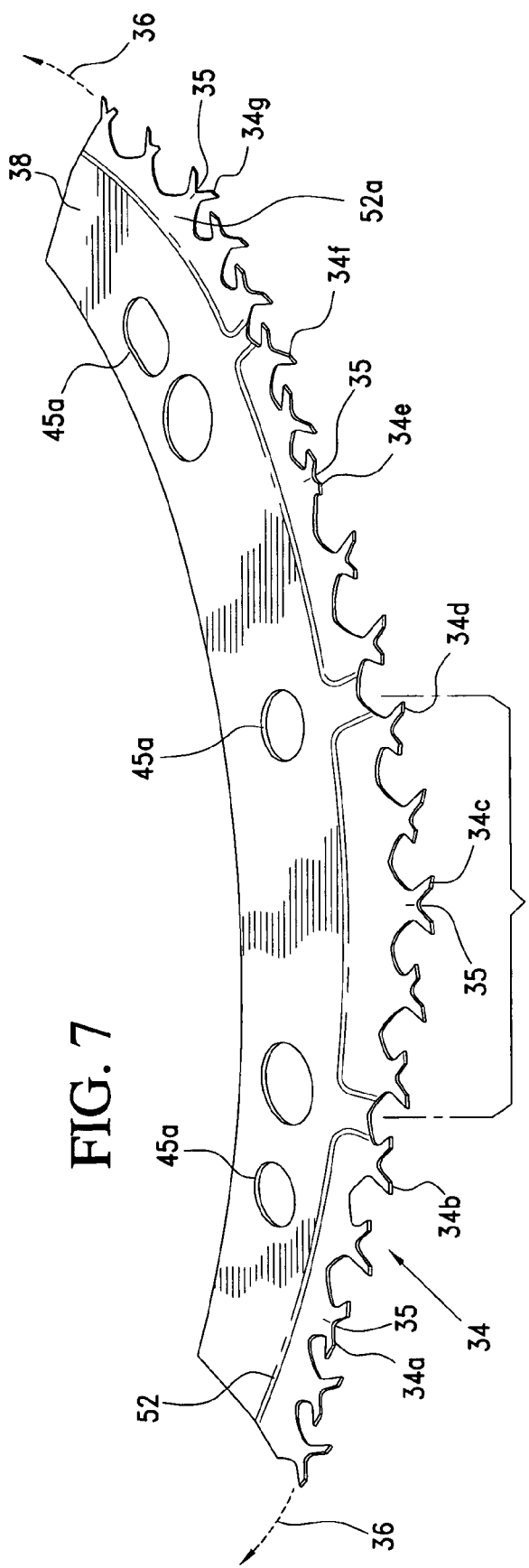

FIG. 7 is an isometric view of the rasp blade of FIGS. 5 and 6.

Figure 7A:
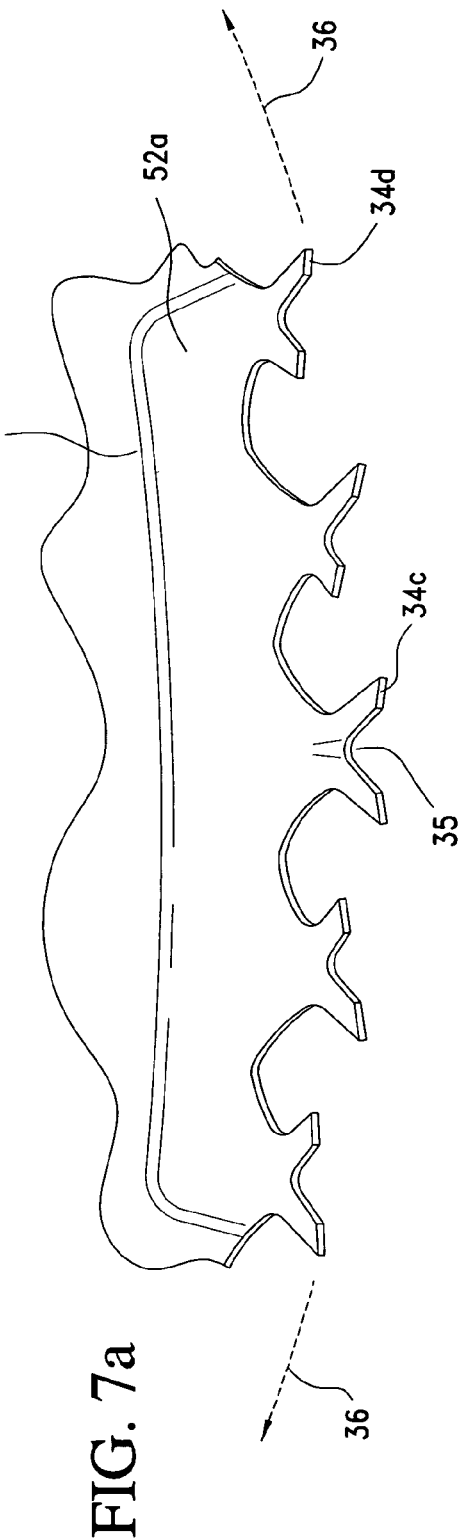

FIG. 7*a* shows enlarged details of a section of the rasp blade of FIG. 7.

Figure 8:
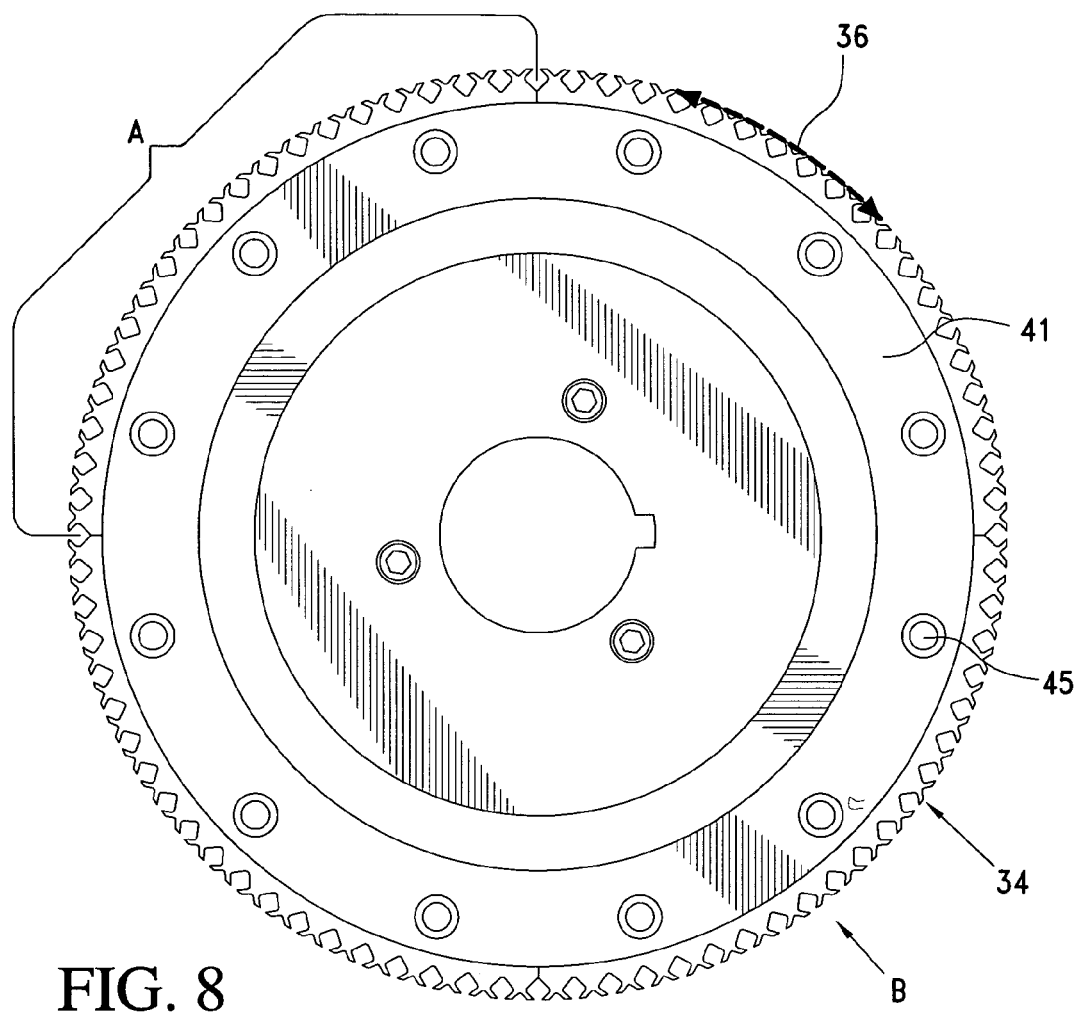

FIG. 8 is a side view of a tire rasp hub assembly in the preferred form of the present invention.

Figure 9:
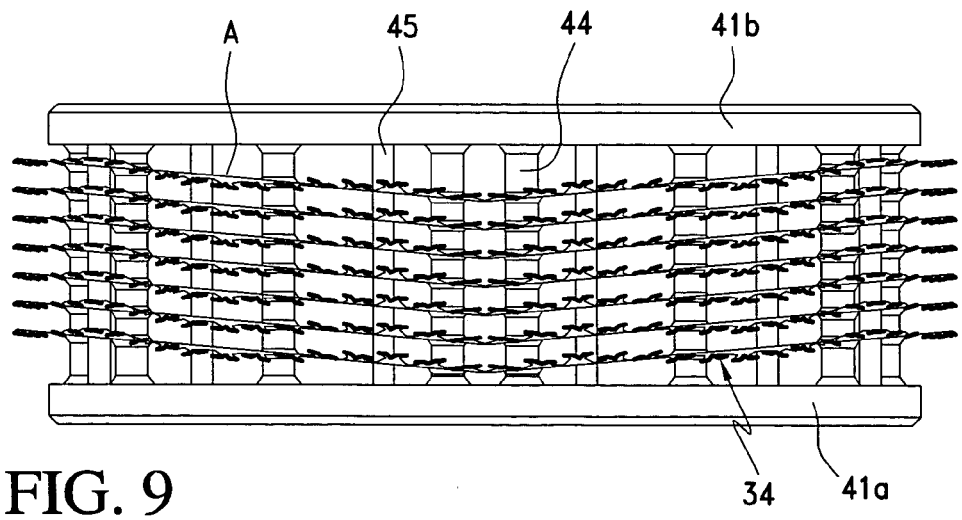

FIG. 9 is a top or plan view of the tire rasp hub assembly of FIG. 8.

Figure 10:
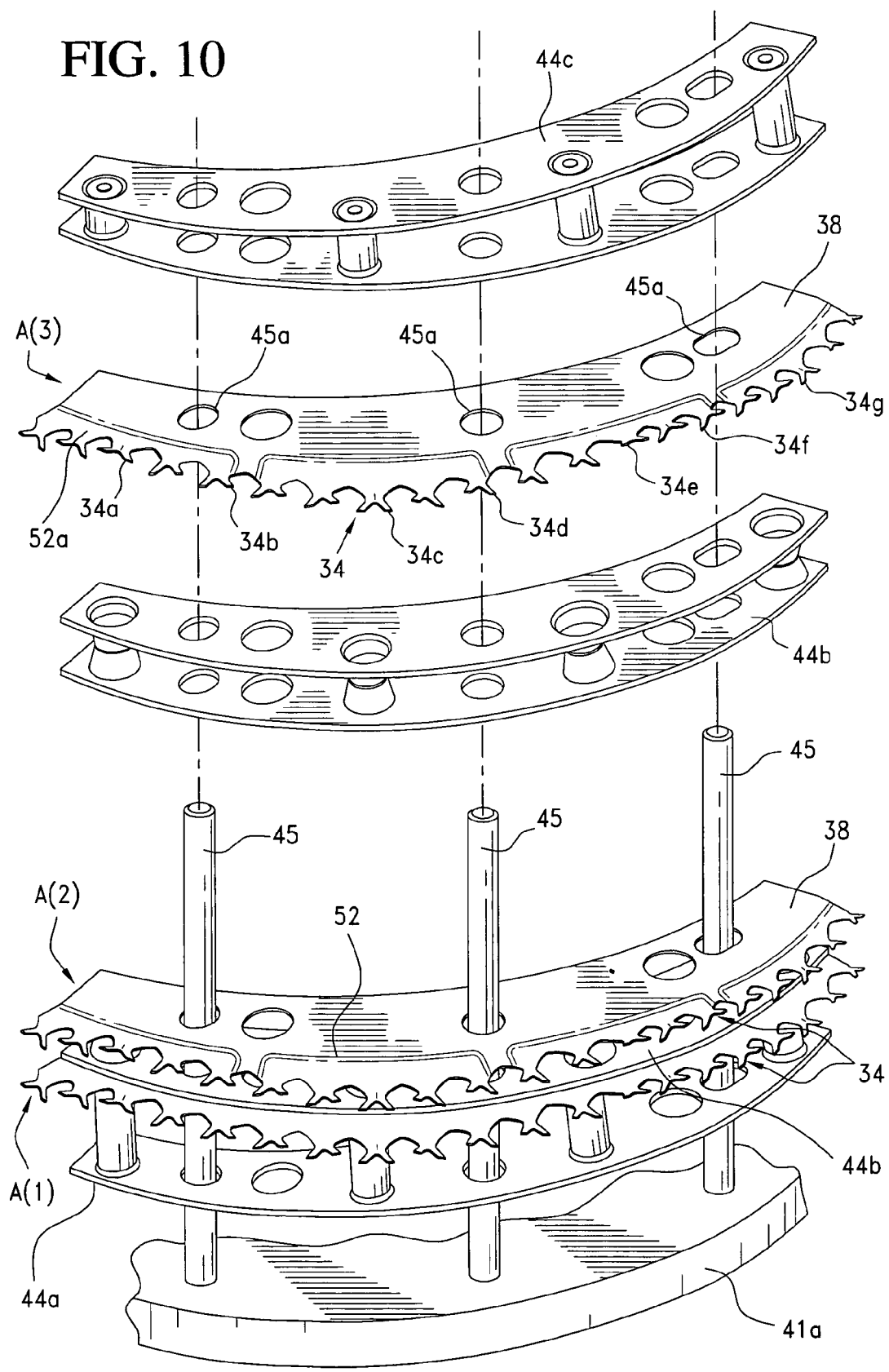

FIG. 10 is a perspective, assembly view of a portion of the rasp hub of FIGS. 8 and 9, showing the use of the rasp blade of FIGS. 5-7a.

DETAILED DESCRIPTION

37 C.F.R § 1.77(b)(8)

Referring now to FIG. 1, a rasp blade used on a 9-inch hub assembly B, generally referred to by the letter A, includes an arcuate, planar body 38, which is typically of a length so that four or more of such blades form a complete circle when attached to circular rasp hubs, as is well known in the art. The rasp hubs are used with a rasp hub assembly B (shown in FIG. 8) that is used for rotating the blades relative to the tire to be cut or buffed. The rasp blade A is formed by stamping it into a flat stock or planar blank. After forming, the body 38 and the tooth pairs in FIG. 1 all lie in the same plane, as shown in the broken section of the top view of blade A in FIG. 2.

The blade body 38 is provided with spaced holes 45a through which pass pins 45 (shown in FIGS. 8-10) carried in the hub assembly B and serving to attach the blade A to the hub assembly B, as is known in the art.

The blade A has multiple sets of tooth pairs 34 on the outside of the arcuate edge. For purposes of describing the preferred embodiment of the invention clearly, tooth pairs 34a-34g have been identified specifically on the drawings. The tooth pairs 34 shown are of a conventional dovetail shape. Each of the 20 tooth pairs 34 shown is identified from 1 to 20, which corresponds to the tooth pairs 34 listed in the table of FIG. 3. In the preferred embodiment of the invention shown in FIG. 1, the minimum radius of the tooth pairs 34 is 114.2 mm and the maximum radius is 114.8 mm. As can be seen from the plotted distribution of the radii of the tooth pairs 34 in FIG. 4, the radii vary from a minimum radius to a maximum radius, with 4 tooth pairs 34a, 34b, 34c and 34d being at a maximum radius, 8 tooth pairs 34 being at a minimum radius and 8 tooth pairs being at radius between the minimum and the maximum radii.

Although 20 tooth pairs 34 are shown in the preferred embodiment, varying numbers of tooth pairs 34 may also be used with the invention. Typical numbers of tooth pairs 34 range from 16 to 24, but there may also be more or less tooth pairs 34 without departing from the invention.

FIGS. 3a and 3b are tables showing the radii of a first and second alternative preferred embodiment of the invention. FIG. 3a shows the radii of an unbent rasp blade used on a 10.5-inch diameter rasp hub assembly B and FIG. 3b shows the radii of an unbent rasp blade used on an 11.5-inch diameter rasp hub assembly B. It is contemplated that the invention not be limited to the dimensions provided, but instead the radii may vary with varying desired rasp hub assembly B diameters.

In FIG. 5, the blade A is shown after the tooth pairs 34 on the outer tooth portion 52a have been bent laterally at the deformation line 52 (best seen in FIG. 6) to form a curved cutting edge 36. The planar body 38 defines a plane perpendicular to the axis of rotation of the planar body 38. The curved cutting edge 36 is the edge of the blade along the tooth pairs 34 along the length of the blade A. The cutting edge 36 is the surface that engages the tire to be cut and buffed by the tooth pairs 34. The bent surfaces are formed by placing the unbent blade in FIG. 1 into a die that has the desired configuration. The resulting radius 50 of the cutting edge 36 is substantially the same. As seen in FIGS. 5 and 6, the cutting edge 36 varies with the position of the tooth pairs. When looking at the tooth pairs 34 on the blade A after the periphery has been bent, reference should be made to the Table in FIG. 3 to understand fully the relationship between the differing radii of the tooth pairs 34 and the curved sections on the blade A. The "Tooth Pair" numbers shown in the table in FIG. 3 correspond to the tooth pair 34 position from the left end of the blade A. Reference number 34a-34g are also provided in FIG. 3 to show clearly the position of the tooth pairs 34a-34g in relation to the drawings.

The third tooth pair 34a from the left is on the outermost position at the top of the curved cutting edge 36. The fifth tooth pair 34b is approximately on the plane of the planar body 38. The eighth tooth pair 34c is on the outermost position at the bottom of the curved cutting edge 36. The tenth tooth pair 34d is approximately on the plane of the planar body 38. The thirteenth tooth pair 34e is on the outermost position at the top of the curved cutting edge 36. The fifteenth tooth pair 34f is approximately on the plane of the planar body 38. The eighteenth tooth pair 34g is on the outermost position at the top of the curved cutting edge 36. As is shown in the plot of the radii from FIG. 3 in FIG. 4, the tooth pairs 34a, 34c, 34e and 34g, which are at the outermost positions, have the greatest pre-bent radius, while the tooth pairs 34b, 34d and 34f, which are approximately on the plane of the planar body 38, have the minimum pre-bent radius. When the tooth pairs 34a, 34c, 34e and 34g, which have the largest pre-bent radius, are bent outward, the lateral deformation reduces the resulting radius to the substantially uniform radius 50, shown in FIG. 6.

In the preferred embodiment shown in FIG. 3, the largest pre-bent radius of tooth pairs 34a, 34c, 34e and 34g is 114.8 mm. The largest pre-bent radius occurs at tooth pairs identified as 34a, 34c, 34e and 34g. An enlarged portion of the rasp blade from FIG. 1 is shown in FIG. 1a and shows the larger radius of tooth pair 34a in comparison with tooth pair 34b.

The preferred embodiment of FIG. 3 is normally used on a 9-inch hub assembly B. In FIG. 3a the pre-bent dimensions are shown for a first alternative preferred embodiment of the invention that is normally used on a 10.5-inch hub assembly B. In FIG. 3b the pre-bent dimensions are shown for a second alternative preferred embodiment of the invention that is normally used on an 11.5-inch hub assembly B. Both the first and second alternative embodiments include 20 tooth pair dimensions and 22 tooth pair dimensions. It is contemplated that more than 22 tooth pairs may also be used without departing from the invention.

Typically the uniform radius 50, shown in FIG. 6, will equal the minimum pre-bent radius because of the reduction in radius of the laterally bent sections after bending. It is contemplated that the radii provided may be longer or shorter, as desired. The curve shape is generally sinusoidal or a single helix configuration, but alternative curved shapes are also contemplated. The number of laterally bent sections may vary. Although the preferred embodiment shows 4 sections, there can be more or less without departing from the invention.

FIG. 7 is an isometric view of the rasp blade A, also after the tooth pairs 34 have been bent laterally to form a cutting edge 36. In addition to being bent laterally, the tooth pairs 34 are twisted relative to the plane of the planar body 38 as also shown in the enlarged sectional view of FIG. 7a. The twisting of the tooth pairs 34 is known in the art. However, the tooth pairs 34 in the embodiment of the present invention are twisted along the cutting edge 36 with a consistent direction of twist from one end of the blade to the other. As can best be seen in FIG. 5, the leftmost two tooth pairs 34 are twisted clockwise. The third tooth pair 34a from the left end of the blade A is bent at its center with its apex 35 being positioned towards the plane of the planar body 38. FIG. 5a shows a detail of a section of the blade of FIG. 5 and shows the apex 35 of tooth pair 34g. The tooth pairs 4-7 from the left end of the blade A are twisted counterclockwise; the eighth tooth pair 34c from the left end of the blade A is bent at its center with its apex 35 being positioned towards the planar body 38; the ninth through twelfth from the left of the blade A tooth pairs are twisted clockwise; the thirteenth from the left of the blade A tooth pair 34e is bent at its center with its apex 35 being positioned towards the planar body 38; the fourteenth through seventeenth from the left of the blade A tooth pairs are twisted counterclockwise; the eighteenth from the left of blade A tooth pair 34g is bent at its center with its apex 35 being positioned towards the plane of the planar body; and the nineteenth and twentieth from the left of the blade A tooth pairs are twisted clockwise. Such a gradual twisting of the tooth pairs 34 along the cutting edge 36 assists to create a uniform buffed surface of the tire surface. The gradual twisting also results in a favorable texture of the buffed surface of the buffed tire.

FIG. 6 shows a side view of the rasp blade A after the outer tooth portion 52a has been bent at the deformation line 52. As previously indicated, after bending, the radius line 50 along the cutting edge 36 is generally the same. The approximately uniform radius 50 causes the cutting edge 36 to make contact substantially along its entire length with the worn tire tread when cutting or buffing.

The alternating bent curved sections extend angularly from the perpendicular plane defined by the planar body 38.

The continuous transition between alternating bent curved sections can be seen on the top view of FIG. 5. The angularity of the outer tooth portion 52a relative to the planar body 38 increases progressively as the outer tooth portion 52a extends further from the perpendicular plane of the planar body. The continuous transition is believed to provide numerous advantages, including but not limited to the following:

First, all of the cutting teeth 34 on the cutting edge 36 of the rasp blade A perform cutting and buffing work on the tire to be cut because there is a continuous transition between laterally bent alternating sections.

Second, the continuous transition between laterally bent alternating 25 sections contributes to added blade strength to resist lateral forces and lateral deformation. The resistance to lateral forces and deformation results in less blade breakage to extend the life of the blade A and therefore reduce the operating costs to the company who is performing the tire buffing operation.

Third, the continuous transition cuts the tire surface consistently to create a uniform buffed surface that is desirable for the application of the new tire tread. The continuous transition between alternating curved sections also results in an improved texture of the buffed surface.

Fourth, the continuous transition avoids the production of thin strips of rubber from the tire shoulder or from between the alternating bent sections. The thin strips that would otherwise be created, can feed into and foul the exhaust system used in the buffing process, and can create a ridge on the tire that would then need to be rebuffed.

FIG. 8 is a side view of a tire rasp blade hub including four rasp blades A (identified by a bracket) positioned on pins 45. In FIG. 9, a top view of the rasp blade hub is shown with multiple rasp blades A mounted on pins 45. The rasp blades are mounted at an angle relative to the direction of rotation of the rasp hub 41. In a vertical arrangement of the rasp blades A on the rasp hub 41, an angled spacer 44a that is wider at one end than at the other end is provided. The detailed mounting configuration of the rasp blades A on the rasp hub 41a is shown in FIG. 10. After a first offset spacer 44a has been mounted on the pins 45 a first rasp blade A(1) is mounted on the pins 45, then a parallel spacer 44b is mounted on the pins 45 followed by another rasp blade A(2). Then a subsequent rasp blade A(3) is mounted on the pins 45. The assembly continues including the mounting of a rasp blade A, then a parallel spacer 44b until the desired numbers of rasp blades A are assembled on the pins 45. In FIG. 9 the number of rasp blades A is seven, but this may vary according the width of the rasp hub. Once the final desired rasp blade A is in position, a second offset spacer 44c is placed on the pins 45 before finally assembling the pins to the other rasp hub 41b (shown in FIG. 9). The orientation of the second angled spacer 44c is reversed relative to the orientation of the first angled spacer 44a.

When the hub assembly B is mounted to the buffing machine (not shown), the blades A may be presented to the worn tire in a vertical configuration or a horizontal configuration (not shown). As the hub assembly B rotates, the cutting edge 36 of each blade A is brought into contact with the tread of the worn tire. Because the plurality of pairs of cutting teeth 34 of each blade A are disposed in a wave like configuration, and in a non-planar configuration relative to the planar body 38, when the blade A sweeps against the worn tire, the cutting teeth 34 contact and remove tread from a broad area of the worn tire equal to the lateral distance or amplitude between the tooth furthest above the plane of the planar body 38 and the tooth furthest below the plane of the planar body 38. The adjacent blades A(2) and A(3) are spaced apart such that the tooth furthest above the planar body of blade A(2) and the tooth furthest below the planar body of blade A(3) are aligned when viewed from the direction of rotation, such that the tread areas of the worn tire that each blade will remove are abutting or overlapping. When the blades A are set up in the hub assembly B in this configuration, the action of the blades across the tread of the worn tire will result in a broad sweeping action removing the tread from the entire tread surface of the worn tire with minimal or no need for relative sideways movement of the worn tire and the hub assembly. The blades A therefore increase the cutting edge area of the stack, resulting in fewer required rasp blades A per stack to achieve an acceptably buffed tire surface.

Because the rasp blade A is not bent in the mid-portion of the side of the blade as in U.S. Pat. No. 5,504,981, but instead has a conventional planar body 38 and a separate cutting teeth portion 52a formed outward from the deformation line 52 (FIG. 7a), comprising a plurality of pairs of teeth 34 disposed in a laterally displaced configuration relative to the planar body 38, the planar body 38 can be used in conjunction with conventional planar spacers and conventional planar end caps to form the hub assembly B shown in FIGS. 8 and 9.

Conventional rasp blade hubs use spacers 44a, 44b, 44c between blades. The spacers are generally designed for use with rasp blades having planar bodies. Because the body 38 of the blade A in the preferred embodiment is planar, it can be used with conventional spacers on existing rasp blade hubs. This can save the operator tooling costs because the rasp blade of this invention can be used on existing rasp hub equipment.

The foregoing disclosure and description of the invention are illustrative and explanatory thereof, and various changes in the size and shape of hubs and configurations, and differing materials, as well as changes in the details of the illustrated embodiments may be made without departing from the spirit of the invention.

What is claimed is:

1. A rasp blade for removing worn tread from a tire, comprising:
   a. a planar body defining a plane perpendicular to the axis of rotation and having a separate cutting teeth portion at its outer working edge;
   b. said cutting teeth portion extending laterally relative to said perpendicular plane of said planar body; and
   c. said cutting teeth portion being disposed in a substantially continuous transition of alternating sets of lateral sections; each lateral section being oppositely curved from each adjacent lateral section and each lateral section extending angularly from said perpendicular plane of said planar body.

2. A rasp blade as in claim 1, wherein there is an even number of said oppositely curved sections.

3. A rasp blade as in claim 1, wherein there is an odd number of said oppositely curved sections.

4. A rasp blade as in claim 1 wherein there are four of said oppositely curved sections.

5. A rasp blade as in claim 1 wherein said alternating sets of oppositely curved sections form a single helix along said outer periphery.

6. A rasp blade as in claim 1 wherein said outer working edge is defined by a deformation line substantially parallel to an inner edge of said rasp blade.

7. A rasp blade as in claim 1 wherein an equal number of said cutting teeth are disposed on each side of said planar body.

8. A rasp blade as in claim 1 wherein an unequal number of said cutting teeth are disposed on each side of said planar body.

9. A rasp blade as in claim 1 wherein said cutting teeth are twisted gradually along said oppositely curved sections relative to said planar body.

10. A rasp blade as in claim 1 wherein said cutting teeth at said outer working edge are all defined by a uniform radius from a center point of said rasp blade.

11. A rasp blade assembly wherein a plurality of said rasp blades of claim 1 are mounted side to side on a circular rasp blade hub.

12. A rasp blade assembly as in claim 11 wherein said assembly of rasp blades form a circumference about said rasp blade hub to form a circular cutting surface.

13. A rasp blade assembly as in claim 11 wherein said blades are mounted to said rasp blade hubs with mounting pins that penetrate holes located on said planar body of said rasp blades.

14. A rasp blade assembly as in claim 13 wherein an angled planar spacer is positioned on one end of a first said rasp blade assembly, a parallel spacer between subsequent said rasp blades and an additional angled planar spacer on another end of said multiple rasp blades.

15. A rasp blade assembly as in claim 13 wherein a planar spacer is positioned on one end of a first said rasp blade assembly, a parallel spacer between subsequent said rasp blades and an additional planar spacer on another end of said multiple rasp blades.

16. A rasp blade for removing worn tread from a tire, comprising:
   a. a planar body with a separate cutting teeth portion at its outer working edge;
   b. said cutting teeth portion extending laterally relative to said planar body;
   c. said cutting teeth portion being disposed in alternating sets of oppositely curved sections; and
   d. said alternating sets of oppositely curved sections and the outer working edge form a sinusoidal curve along said outer working edge.

17. A method of manufacturing an arcuate rasp blade, comprising the steps of:
   a. forming a planar body defining a plane perpendicular to the axis of rotation of said planar body and a separate cutting teeth portion at its outer working edge;
   b. extending said cutting teeth portion of said planar body laterally relative to said perpendicular plane of said planar body;
   c. disposing said cutting teeth portion in a substantially continuous transition of alternating sets of lateral sections;
   d. curving each lateral section oppositely from each adjacent lateral section; and
   e. extending each lateral section angularly from said perpendicular plane of said planar body.

18. The method of claim 17 wherein the radii of said cutting teeth on said curved sections all lie at substantially the same circumferential radius.

19. The method of claim 18 wherein the cutting teeth on said curved sections form a substantially sinusoidal curve.

20. The method of claim 17 wherein the cutting teeth on said curved sections form a substantially single helix configuration.

21. A method of manufacturing a rasp blade comprising the steps of:
   a. forming a planar body having a separate cutting teeth portion at its outer working edge;
   b. extending said cutting teeth portion laterally relative to said planar body;
   c. disposing said cutting teeth portion in alternating sets of oppositely curved sections; and
   d. forming said alternating sets of oppositely curved sections and outer working edge into a sinusoidal curve along said outer working edge.

* * * * *